United States Patent [19]

Holter et al.

[11] 4,201,751

[45] May 6, 1980

[54] GAS PURIFICATION

[76] Inventors: Heinz Hölter, Beinstr. 39-41, 439 Gladbeck; Heinz Gresch, Dornestr. 89, 46 Dormund-Derne; Heinrich Igelbüscher, Marcq-en-Baroeul-Str. 60, 439 Gladbeck, all of Fed. Rep. of Germany

[21] Appl. No.: 844,185

[22] Filed: Oct. 21, 1977

Related U.S. Application Data

[63] Continuation-in-part of Ser. No. 683,205, May 4, 1976, Pat. No. 4,061,476.

[30] Foreign Application Priority Data

| Date | Country | Number |
|---|---|---|
| May 6, 1975 [DE] | Fed. Rep. of Germany | 2520045 |
| Dec. 9, 1975 [DE] | Fed. Rep. of Germany | 25552209 |
| Mar. 4, 1976 [DE] | Fed. Rep. of Germany | 2608935 |
| Apr. 10, 1976 [DE] | Fed. Rep. of Germany | 2615828 |
| Oct. 21, 1976 [DE] | Fed. Rep. of Germany | 2647520 |

[51] Int. Cl.$^2$ ............................................. B01D 53/34
[52] U.S. Cl. .................................... 423/210; 423/230; 423/231; 423/239; 423/236; 423/240; 423/244; 423/245; 252/191; 252/192; 252/455 R; 252/459; 252/466 J; 252/468; 252/473; 252/474

[58] Field of Search ............... 423/210, 230, 231, 239, 423/244, 240, 245, 236; 252/191, 192, 455 R, 459, 466 J, 468, 473, 474; 75/25

[56] References Cited

U.S. PATENT DOCUMENTS

| | | | |
|---|---|---|---|
| 1,934,242 | 11/1933 | Smyly | 423/231 |
| 1,976,806 | 10/1934 | Rosen et al. | 423/231 |
| 2,122,236 | 6/1938 | Nichols et al. | 252/8.5 B |
| 3,492,083 | 1/1970 | Lowicki et al. | 423/244 |
| 3,579,293 | 5/1971 | Shutz et al. | 423/231 |
| 3,839,227 | 10/1974 | Schlaefer et al. | 252/455 R |
| 3,882,221 | 5/1975 | Wilson | 423/244 A |
| 3,895,088 | 7/1975 | Goksel | 264/82 |
| 3,959,440 | 5/1976 | Mizume et al. | 423/239 |
| 3,983,218 | 9/1976 | Heins | 423/244 |
| 4,025,604 | 6/1977 | Moriguchi et al. | 423/239 |

*Primary Examiner*—Earl C. Thomas
*Attorney, Agent, or Firm*—Aisenberg & Platt Berman

[57] ABSTRACT

Pulverent solid sorption agent is injected into and, optionally, admixed with a stream of noxious-contaminant-containing gas and then separated from such gas. The solid sorption agent comprises an alkali-metal and-/or alkaline-earth-metal compound and advantageously contains iron-III-oxide; such agent is preferably in the form of dust developed during production of iron or steel.

14 Claims, No Drawings

GAS PURIFICATION

CROSS REFERENCE TO RELATED APPLICATION

This application is a continuation-in-part of application Ser. No. 683,205, filed on May 4, 1976, now U.S. Pat. No. 4,061,476. The entire disclosure of this parent application is incorporated herein by reference.

BACKGROUND

A number of industrial and other gases have noxious components which may be regarded as contaminants. Such gases are purified or separated from one or more noxious components by contact with solid sorption agents.

The solid sorption agents are single chemical compounds or admixtures of plural ingredients; they are generally employed in a finely-divided state to present the gas with a larger available contact surface. After sorption is effected, the noxious components removed from the gas are separated from the sorption agents, which can then be reused.

Appropriate sorption agents for the removal of recognized noxious components of such contaminated gases are known and available. They are employed in the form of a fixed filter bed (in an unmoved state) through which noxious-component-containing gas is passed or in the form of a fluidized bed.

Where input or contaminated gas is passed through a fixed filter bed, sorption ordinarily takes place extremely slowly, requiring extraordinarily voluminous filters and considerable energy to force the gas through such filters. When the gas is conducted through a fluidized bed, which consists of granular sorption material, the resulting purification effect is normally increased only slightly, and energy consumption is reduced only slightly; moreover, the granular sorption agent is abraided and the sorption agent must be renewed very often.

Known dry sorption methods for gas purification entail the disadvantage that, in spite of having systems capable of handling very large volumes of sorption agents, only comparatively small volumes of gas are purified and a reasonably-adequate purification is achieved only at gas temperatures below 600° C. This also makes structural requirements and operation of very large plants extraordinarily expensive.

SUMMARY OF THE INVENTION

Alkali-metal- or alkaline-earth-metal-containing and $Fe_2O_3$-containing absorption agent is used (preferably in a particular manner) for removing noxious or other contaminant substances, especially $H_2S$, $SO_2$, HCN, $NO_x$, HF, HCl, phenol, formaldehyde and the like, from gases which are brought into contact with the absorption agent. Such harmful substances are removed from gases by $Fe_2O_3$-containing absorption agents with alkali-metal and/or alkaline-earth-metal compounds which are introduced into and thus placed in contact with a gas stream, and thus with contaminants therein, and then subsequently separated from the gas. By further admixing the absorption agent (with alkali-metal and/or alkaline-earth-metal compounds) with the contaminated gas stream, more intimate contact and better contaminant removal are obtained.

An otherwise substantially-worthless byproduct of iron or steel production, in the form of dust containing iron-III-oxide ($Fe_2O_3$) in combination with alkali-metal oxide and/or alkaline-earth-metal oxide, has been found to be a particularly effective absorption agent when employed in this process. No prior use for such dust, which previously had to be dumped, is known. The present invention thus provides an absorption agent (and the use of such agent) with improved absorption properties and which is available in large quantities at low cost.

DETAILS

Although effective contact is achieved by merely passing a contaminated gas stream through a bed of the subject absorption agent, better results are obtained with a fluidized bed and even greater contaminant removal is effected when the absorption agent is intimately admixed with the contaminated gas stream. Such intimate admixture is achieved, e.g., by conducting the absorption agent into the gas stream as the latter is, e.g., passed through tube-shaped sections with venturi-like inserts. Such inserts cause turbulence in the gas stream and thus produce intensive and intimate contact between the absorption agent, the gas and any contaminants in the gas. After a comparatively short contact period, the absorption agent is removed from the gas stream. Such procedures are effective when the absorption agent comprises an alkali-metal compound and/or an alkaline-earth-metal compound and $Fe_2O_3$.

The use of waste dust (developed during production of iron and steel and containing iron-III-oxide in combination with alkali-metal-oxide and/or alkaline-earth-metal oxide) as absorption agent in this process has proved particularly advantageous. In view of the alkaline properties of this dust, it is extremely useful for removing noxious contaminants from gases. The following Table shows quantitative analyses for three different dust samples taken from the steel industry's dust-removal systems at various times and locations. Sample 1 is from a basic oxygen steel-making plant; Sample 2, an open-hearth steel plant; and Sample 3, a pig-iron mixer in which desulfurization is effected. Similarly-useful dust is obtained, e.g., from dust removal equipment in an electric steel plant.

| Composition % by weight | 1 | 2 | 3 |
| --- | --- | --- | --- |
| Annealing or Ignition loss (Gluhverlust) | 6.07 | 2.38 | 3.02 |
| $SiO_2$ | 1.97 | 1.04 | 0.93 |
| $Fe_2O_3$ | 48.88 | 42.50 | 33.42 |
| $Al_2O_3$ | 0.00 | 0.50 | 0.20 |
| CaO | 28.75 | 23.20 | 23.34 |
| MgO | 3.70 | 6.25 | 4.02 |
| $Na_2O$ | 3.80 | 2.80 | 2.45 |
| $K_2O$ | 0.71 | 1.43 | 1.02 |
| Pb | — | 1.04 | 1.62 |
| V | — | 0.50 | 0.80 |
| Ni | — | 0.08 | 0.12 |
| $P_2O_5$ | — | 1.28 | 2.14 |
| $SO_3$ | 1.54 | 4.58 | 16.33 |
| Zn | 0.00 | 3.25 | 1.68 |

Higher alkalinity is imparted to such dust by admixing calcium hydroxide and/or fine white lime (Weissfeinkalk) therewith. [Weissfeinkalk is about 95 percent by weight of CaO; it is prepared by calcining limestone and grinding the calcined product so that 99 percent by weight thereof has a grain size of less than 3 mm.] As a number of contemplated contaminants, such as $H_2S$, $SO_2$, HCN, nitrogen oxides ($NO_x$), HF and HCl are acidic, such higher alkalinity is advantageous in their removal from the gas stream. The absorption capability of such dust is further improved by adding bog iron ore and/or heavy metal salt, such as a salt of lead, silver, gold, mercury, bismuth or copper, e.g. cuprous chloride.

The noted dust is a useful absorbing agent both in natural and in pelletized form; it is used either dry or moist. When employed in moist form, metal components form metal hydroxides, which have highly-active properties for quantitatively binding noxious substances, such as $H_2S$, HCN, $NO_x$ and $SO_2$.

Any aluminum in the absorption agent is ordinarily in complex form, such as in the form of an aluminate, due to its amphoteric properties under alkaline conditions, but this does not preclude it from binding noxious contaminants.

The absorption agent is suitably in the form of a pulverulent material. It is optionally in finely divided, e.g. powder or dust, form, in pellet form or on an appropriate carrier, such as sawdust, wood flour, expanded clay or expanded perlite. It may, but need not necessarily, contain components which react chemically with one or more contaminating components of the gas under conditions of contact.

The absorption agent is advantageously used in conjunction with, on the surface of or throughout a carrier. Suitable carriers include sawdust, wood flour and expanded clay, e.g. expanded vermiculite; those having particularly large surface areas are preferred. Favorable properties are obtained when expanded ("popped" or exploded) perlite is the carrier on which the absorption agent is applied. For this purpose, the absorption agent or the dust is, e.g., stirred with water to form a sprayable suspension which is applied to or sprayed upon the perlite in a mixer.

Using expanded perlite as carrier provides a number of advantages, particularly during dry absorption. The low specific weight of the combined carrier and absorption agent makes it possible to have a large amount of absorption agent on or throughout the carrier without significantly negatively influencing the flight or flow pattern of absorption-agent particles in the contaminated air or other gas stream being cleaned. The bizarre shape and the large surface area of perlite grains guarantee good adhesion of the sprayed-on absorption agent or dust suspension and provide favorable prerequisites for reprocessing consumed or exhausted absorption agent.

Perlite is chemically neutral; it does not burn; it is humidity and moisture resistant; and it is free of organic impurities. Moreover, the porous structure of expanded perlite permits a high degree, e.g. up to 70%, of water intake; this accounts for the improved absorption properties obtained when moistened perlite is used as carrier for an absorption agent. For expanded perlite or other carrier, water and caustic soda are illustrative of suitable moistening agents which can be used. Using caustic soda has the advantage of increasing the alkalinity of the absorption agent.

The high sintering temperature (about 1,000° C.) and the high thermal softening temperature (from about 1,220° to about 1,320° C.) of expanded perlite are advantageous carrier properties because they make it possible to use absorption agent (applied on such a carrier) for purifying very hot gases, for example, from coal pressure gassification or from garbage burning, even when such are at temperatures of up to 750° C. or more.

The high temperature resistance of expanded perlite is also advantageous for processing exhausted absorption agent thereon. Exhausted absorption agent on expanded perlite carrier is, e.g., roasted to obtain $SO_2$-containing roasting gases, which are readily processed into sulfuric acid in a Claus system or through wet catalysis. The perlite remains preserved. It is cooled off and reactivated by, e.g., a water spray.

Perlite carrier is preserved even when exhausted material (comprising perlite and absorption agent in dust form) is treated with organic solvent, e.g. when recovering sulfur from the exhausted material. The dust, however, may (in such a process) be chemically converted, in which case the perlite (with remains intact) is again covered with absorption agent dust.

Exhausted absorption agent, i.e. that which is combined with contaminant components, is readily disposed of even when on a carrier, such as perlite, because such requires only a small area in an appropriate dump. Expanded perlite is, e.g., compressed to one tenth of its original volume, which also encompasses all absorbed noxious substances therewith.

The absorption agent according to the invention has sufficient alkalinity to absorb noxious and other contaminant components from gases under stable conditions and in a controlled manner. The presence of alkaline material also facilitates reprocessing or further processing, for example by roasting and moistening, of absorption agents, as a result of which fast reconversion of iron components into iron-III-hydroxide is assured.

The absorption agent according to the invention is used in either dry or moist form for the most varied methods and mechanisms in which harmful substances are removed from gases by means of absorption.

The following examples are merely illustrative examples of the invention and are not limitative of the remainder of the disclosure in any way. In the examples all references to "dust" are to dust of Sample 1 (in the preceding table) from a basic oxygen steel-making plant.

The contaminated gas in Example 1 is typically a gas obtained by pyrolysis of garbage and comprising, besides the contaminants mentioned in the example, nitrogen, carbon dioxide and hydrocarbons.

The gas mentioned in Example 2 is typically a coke oven gas comprising, besides the contaminants mentioned in the example, carbon oxide, hydrogen, carbon dioxide, methane, other hydrocarbons and nitrogen.

The gas in Example 3 is typically a flue gas from coal fired electric power plants. Except the constituents mentioned in Example 3 this gas comprises oxygen, carbon dioxide and nitrogen, small quantities of carbon oxide and dust. The gas mentioned in Example 3 may also be gas deriving from burning of garbage and in this case the gas may comprise in addition larger quantities of dust and hydrochloric acid, the latter in quantities of up to or more than 1.000 mg/nm$^3$.

The contaminated gas stream, however, is not so limited, as the principal gas is virtually any non-acid gas, e.g. rare or inert gas, air, nitrogen or oxygen.

EXAMPLE 1

Pass 5,200 nm$^3$ per hour of contaminated gas (containing 1,500 mg/nm$^3$ of $H_2S$ and 2,500 mg/nm$^3$ of HCl) at 160° C. through a fluidized bed (72 kg per hour) of absorption agent (42 weight percent of dust; 58 weight percent of perlite having a grain size of from 3 to 6 mm) to obtain a purified gas in which the $H_2S$ content and the HCl content are below an analytically-determinable level.

EXAMPLE 2

Pass 5,200 nm$^3$ per hour of contaminated gas (containing 1,500 mg/nm$^3$ of H$_2$S, 150 mg/nm$^3$ of HCN, 40 mg/nm$^3$ of phenol and 20 mg/nm$^3$ of H$_2$F$_2$) at 30° C. through a fluidized bed (72 kg per hour) of absorption agent (42 weight percent of dust; 42 weight percent of water; 16 weight percent of perlite having a grain size of from 3 to 6 mm) to obtain a purified gas in which the H$_2$S content, the HCN content, the phenol content and the HF content are below an analytically-determinable level.

EXAMPLE 3

Pass 5,200 nm$^3$ per hour of contaminated gas (containing 2,000 mg/nm$^3$ of SO$_2$, 1,000 mg/nm$^3$ of HCl and 500 mg/nm$^3$ of nitrogen oxides—NO$_x$) at 140° C. through a fluidized bed (72 kg per hour) of absorption agent (42 weight percent of dust; 15 weight percent of fine white lime; 20 weight percent of water; 23 weight percent of perlite having a grain size of from 3 to 6 mm) to obtain a purified gas in which the SO$_2$ content is 50 mg/nm$^3$, the HCl content is below an analytically-determinable level, and the NO$_x$ content is 150 mg/nm$^3$.

The invention and its advantages are readily understood from the preceding description and examples. Various changes may be made in the process parameters, in the components of the absorption agent and in the mode of contacting contaminated gas with such agent without departing from the spirit or scope of the invention or sacrificing its material advantages. The processes and compositions hereinbefore described are merely illustrative of embodiments of the invention.

What is claimed is:

1. A combination of (a) an absorption agent and (b) carrier, wherein the absorption agent comprises dust developed during iron or steel production and contains Fe$_2$O$_3$ in combination with a member selected from the group consisting of an alkali-metal oxide and an alkaline-earth-metal oxide and wherein the carrier is expanded perlite.

2. A combination according to claim 1 which comprises:
   (a) Fe$_2$O$_3$,
   (b) a member selected from the group consisting of alkali-metal-oxide and alkaline-earth metal oxide, and
   (c) a member selected from the group consisting of calcium hydroxide, fine white lime, bog iron ore and a heavy metal salt.

3. A combination according to claim 2 wherein component (c) is calcium hydroxide.

4. A combination according to claim 2 wherein component (c) is fine white lime.

5. A combination according to claim 2 wherein component (c) is bog iron ore.

6. A combination according to claim 2 wherein component (c) is a heavy metal salt.

7. A combination according to claim 2 in pelletized form.

8. A combination according to claim 1 wherein the absorption agent is pulverulent and the carrier is moistened expanded perlite.

9. A combination according to claim 8 wherein the expanded perlite is moistened with caustic soda.

10. A combination according to claim 1 wherein the absorption agent comprises moisture.

11. A process for removing contaminants from contaminated gas which comprises:
    (a) introducing into and thus contacting a current of the contaminated gas with a combination of
        (1) a solid-form absorption agent comprising dust developed during iron or steel production and containing Fe$_2$O$_3$ in combination with a member selected from the group consisting of an alkali-metal oxide and an alkaline-earth-metal oxide and
        (2) expanded-perlite carrier,
    (b) intimately admixing the absorption agent with the gas, and then
    (c) separating the absorption agent from the gas.

12. A process according to claim 11 wherein the carrier is moistened expanded perlite.

13. A process according to claim 11 wherein step (b) comprises causing sufficient turbulence in the resulting gas stream to produce intensive and intimate contact between the absorption agent, the gas and any contaminants in the gas.

14. A process according to claim 11 wherein step (b) comprises passing the gas stream resulting from step (a) through tube-shaped sections with venturi-like inserts to cause turbulence in the gas stream and thus produce intensive and intimate contact between the absorption agent, the gas and any contaminants in the gas.

* * * * *